United States Patent
Ramsey

(10) Patent No.: US 10,197,112 B2
(45) Date of Patent: Feb. 5, 2019

(54) ONE-WAY WEDGE CLUTCH HAVING RADIALLY OUTER RAMPS

(71) Applicant: Schaeffler Technologies AG & Co. KG, Herzogenaurach (DE)

(72) Inventor: John Ramsey, Lucas, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 740 days.

(21) Appl. No.: 14/716,015

(22) Filed: May 19, 2015

(65) Prior Publication Data
US 2016/0341262 A1    Nov. 24, 2016

(51) Int. Cl.
*F16D 41/063*    (2006.01)
*F16D 41/18*    (2006.01)

(52) U.S. Cl.
CPC ........... *F16D 41/18* (2013.01); *F16D 41/063* (2013.01)

(58) Field of Classification Search
CPC ........ F16D 41/063; F16D 15/00; F16D 43/14; F16D 41/06; F16D 41/082; F16D 41/02; F16D 13/12–13/18; F16D 41/18
See application file for complete search history.

(56) References Cited

U.S. PATENT DOCUMENTS

| | | | | |
|---|---|---|---|---|
| 2,422,533 A | * | 6/1947 | Dodwell | F16D 41/063 192/41 S |
| 3,107,764 A | * | 10/1963 | Fulton | F16D 41/063 192/41 R |
| 5,020,648 A | * | 6/1991 | Bush | F16D 7/048 188/82.6 |
| 2014/0110207 A1 | * | 4/2014 | Davis | F16D 41/08 192/45.1 |
| 2015/0083539 A1 | * | 3/2015 | Lee | F16D 13/14 192/46 |
| 2015/0323018 A1 | * | 11/2015 | Hemphill | F16D 41/063 192/40 |
| 2016/0091034 A1 | * | 3/2016 | Lee | F16D 23/12 192/35 |

OTHER PUBLICATIONS

U.S. Appl. No. 14/622,147, filed Feb. 13, 2015, entitled Electromagnetic Wedge Disconnect Clutch, Lee.

* cited by examiner

Primary Examiner — Huan Le
(74) Attorney, Agent, or Firm — Brooks Kushman P.C.

(57) ABSTRACT

A one-way wedge clutch, including: an axis of rotation; an inner race having a first radially outwardly facing surface; an outer race located radially outward of the inner race and including a first radially inwardly facing surface with a plurality of radially inwardly extending ramps; at least one wedge plate radially disposed between the inner and outer races and including: at least one second radially inwardly facing surface; and, at least one second radially outwardly facing surface including a plurality of radially outwardly extending ramps engaged with the plurality of radially inwardly extending ramps; and, at least one resilient element: engaged with the at least one wedge plate; and, urging at least a portion of the at least one second radially inwardly facing surface toward at least a portion of the first radially outwardly facing surface.

13 Claims, 13 Drawing Sheets

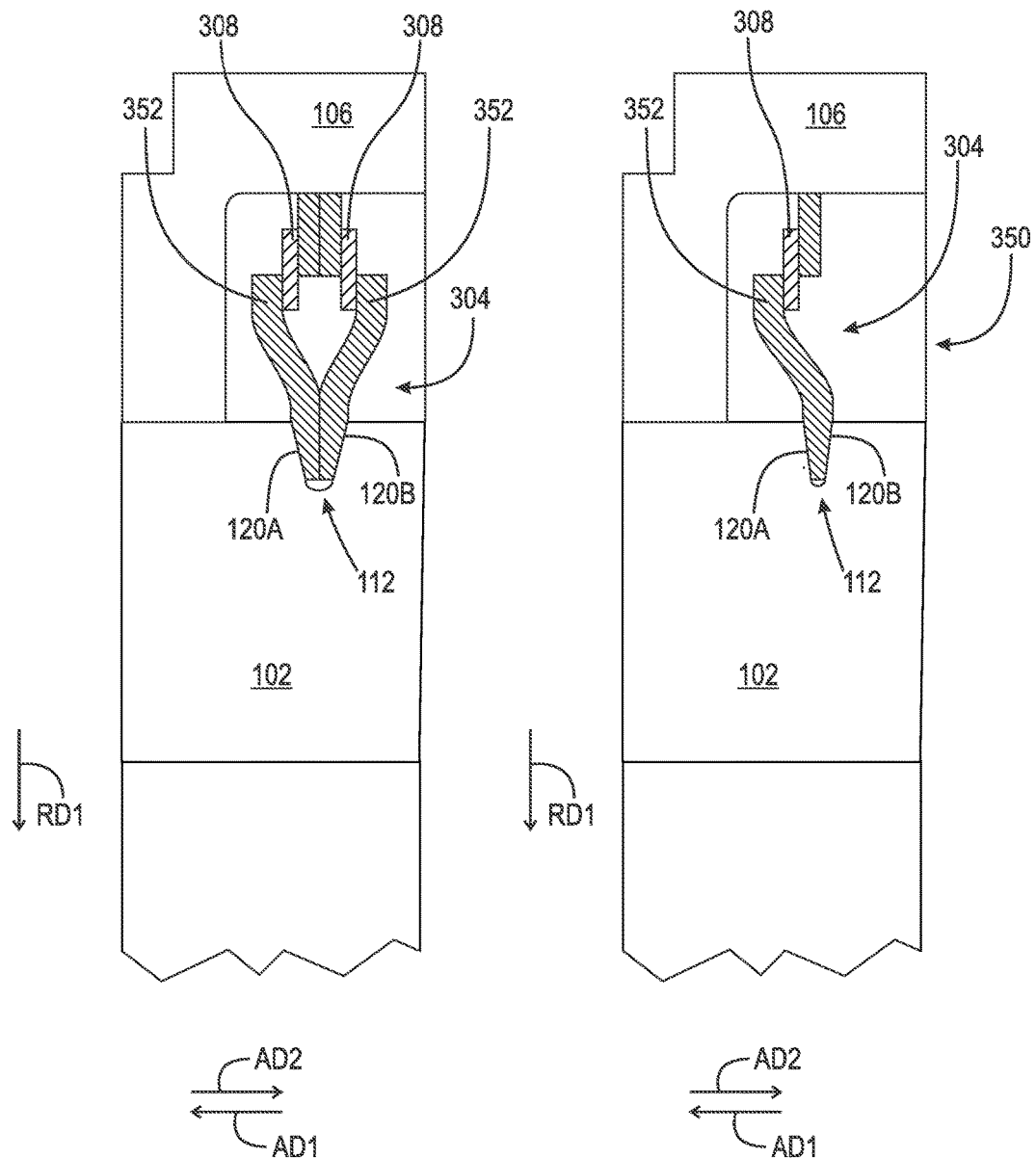

US 10,197,112 B2

ONE-WAY WEDGE CLUTCH HAVING RADIALLY OUTER RAMPS

TECHNICAL FIELD

The present disclosure relates generally to a one-way wedge clutch, and, more specifically, a one-way wedge clutch having an inner race, an outer race, at least one wedge plate with a plurality of ramps on an outer circumference of the at least on wedge plate, and at least one resilient element engaged with the at least one wedge plate. The at least one resilient element urges at least a portion of the at least one wedge plate into contact with the inner race while employing uniform drag.

BACKGROUND

One-way clutches rely on the relative rotation between inner and outer races to switch between a locked mode and a free-wheel mode for the clutch. One-way wedge clutches typically include inner and outer races and a single wedge plate or two wedge plates radially disposed there between. In free-wheel mode, the inner and outer races are rotatable with respect to each other and the at least one wedge plate is rotatable as well. In other words, in free-wheel mode, the extent of the frictional engagement between the at least one wedge plate and the outer race is insufficient to initiate a locked mode. Typically, to initiate a locked mode, in which the inner and outer races and wedge plate are non-rotatably connected, the inner race displaces the wedge plate radially with respect to the outer race. The at least one wedge plate typically includes ramps on the inner diameter; the ramps are operatively arranged to engage correspondingly-shaped ramps on the inner race. Such wedge plates are typically arranged to frictionally engage the outer race via an interference fit. However, wedge clutches of this sort present premature lock-up problems when the inner race rotates with respect to a stationary outer race.

The engagement sequence of a wedge plate typically starts at one circumferential end and wraps around in a circumferential direction as loading takes place. This sequence causes concentrated loading of the outer and inner races at the point of initiation. Thus, typical one-way wedge clutches exhibit non-uniform loading of the wedge clutch components.

Moreover, as the diameter of a one-way wedge clutch increases, the ability to use the wedge plate as a spring to provide a preload force for its engagement decreases. A problem exists surrounding making the wedge plate the appropriate size to provide the appropriate amount of preload required. Additionally, large hysteresis can result from providing a spring that is strong enough to provide the appropriate preload force and resist centrifugal forces.

BRIEF SUMMARY

According to aspects illustrated herein, there is provided a one-way wedge clutch, including: an axis of rotation; an inner race having a first radially outwardly facing surface; an outer race located radially outward of the inner race and including a first radially inwardly facing surface with a plurality of radially inwardly extending ramps; at least one wedge plate radially disposed between the inner and outer races and including: at least one second radially inwardly facing surface; and, at least one second radially outwardly facing surface including a plurality of radially outwardly extending ramps engaged with the plurality of radially inwardly extending ramps; and, at least one resilient element: engaged with the at least one wedge plate; and, urging at least a portion of the at least one second radially inwardly facing surface toward at least a portion of the first radially outwardly facing surface. In a locked mode, the inner race, the at least one wedge plate and the outer race are non-rotatably connected. In a free-wheel mode, the inner race is rotatable with respect to the outer race.

According to aspects illustrated herein, there is provided a one-way wedge clutch, including: an axis of rotation; an inner race having a first radially outwardly facing surface with a circumferentially disposed groove; an outer race located radially outward of the inner race and including a first radially inwardly facing surface with a plurality of radially inwardly extending ramps; at least one wedge plate radially disposed between the inner and outer races and including: at least one second radially inwardly facing surface including at least one chamfer disposed in the circumferentially disposed groove; and, at least one second radially outwardly facing surface including a plurality of radially outwardly extending ramps engaged with the plurality of radially inwardly extending ramps; and, a resilient element: engaged with the at least one wedge plate; applying a force to the at least one wedge plate in a first axial direction; and, urging at least a portion of the at least one chamfer into contact with at least a portion of the circumferentially disposed groove. In a locked mode, the inner race, the at least one wedge plate and the outer race are non-rotatably connected. In a free-wheel mode, the inner race is rotatable with respect to the outer race.

According to aspects illustrated herein, there is provided a one-way wedge clutch, including: an axis of rotation; an inner race having a first radially outwardly facing surface with a circumferentially disposed groove; an outer race located radially outward of the inner race and including a first radially inwardly facing surface with a plurality of radially inwardly extending ramps; at least one wedge plate radially disposed between the inner and outer races and including: at least one second radially inwardly facing surface including at least one chamfer disposed in the circumferentially disposed groove; and, at least one second radially outwardly facing surface including at least one plurality of radially outwardly extending ramps engaged with the plurality of radially inwardly extending ramps; and, at least one resilient element: engaged with the at least one wedge plate; applying a force in a circumferential direction to the at least one wedge plate; and, urging at least a portion of the at least one chamfer toward at least a portion of the circumferentially disposed groove. In a locked mode, the inner race, the at least one wedge plate and the outer race are non-rotatably connected. In a free-wheel mode, the inner race is rotatable with respect to the outer race.

BRIEF DESCRIPTION OF THE SEVERAL VIEWS OF THE DRAWINGS

The nature and mode of operation of the present disclosure will now be more fully described in the following detailed description taken with the accompanying figures, in which:

FIG. 10 is a front perspective partial view of the one-way clutch shown in FIG. 9a;

FIG. 11 is an enlarged view of a portion of the wedge plate and resilient element shown in FIG. 9a;

FIG. 12a is a cross-sectional view taken generally along line 12a-12a in FIG. 9a, showing dual wedge plates; and, FIG. 12b is a cross-sectional view taken generally along line 12b-12b in FIG. 9a, showing a single wedge plate.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and, as such, may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the disclosure. It should be appreciated that the term "substantially" is synonymous with terms such as "nearly", "very nearly", "about", "approximately", "around", "bordering on", "close to", "essentially", "in the neighborhood of", "in the vicinity of", etc., and such terms may be used interchangeably as appearing in the specification and claims. It should be appreciated that the term "proximate" is synonymous with terms such as "nearby", "close", "adjacent", "neighboring", "immediate", "adjoining", etc., and such terms may be used interchangeably as appearing in the specification and claims.

Figure 1:
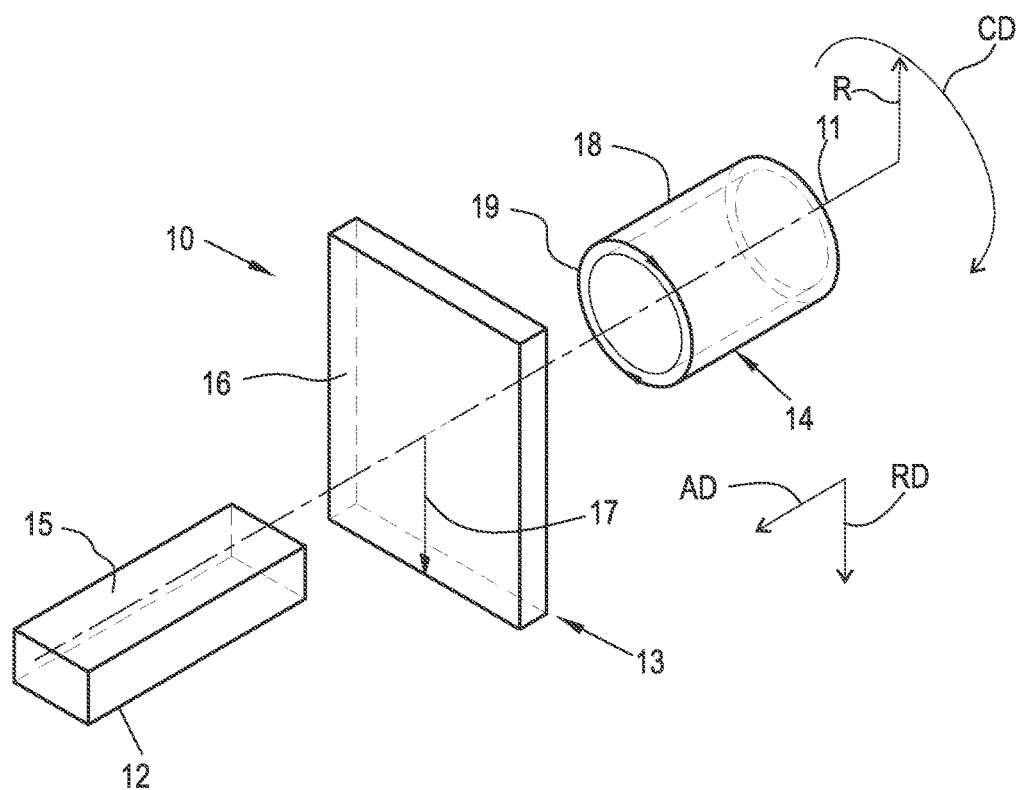
FIG. 1 is a perspective view of a cylindrical coordinate system demonstrating spatial terminology used herein.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 is passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Figure 2:
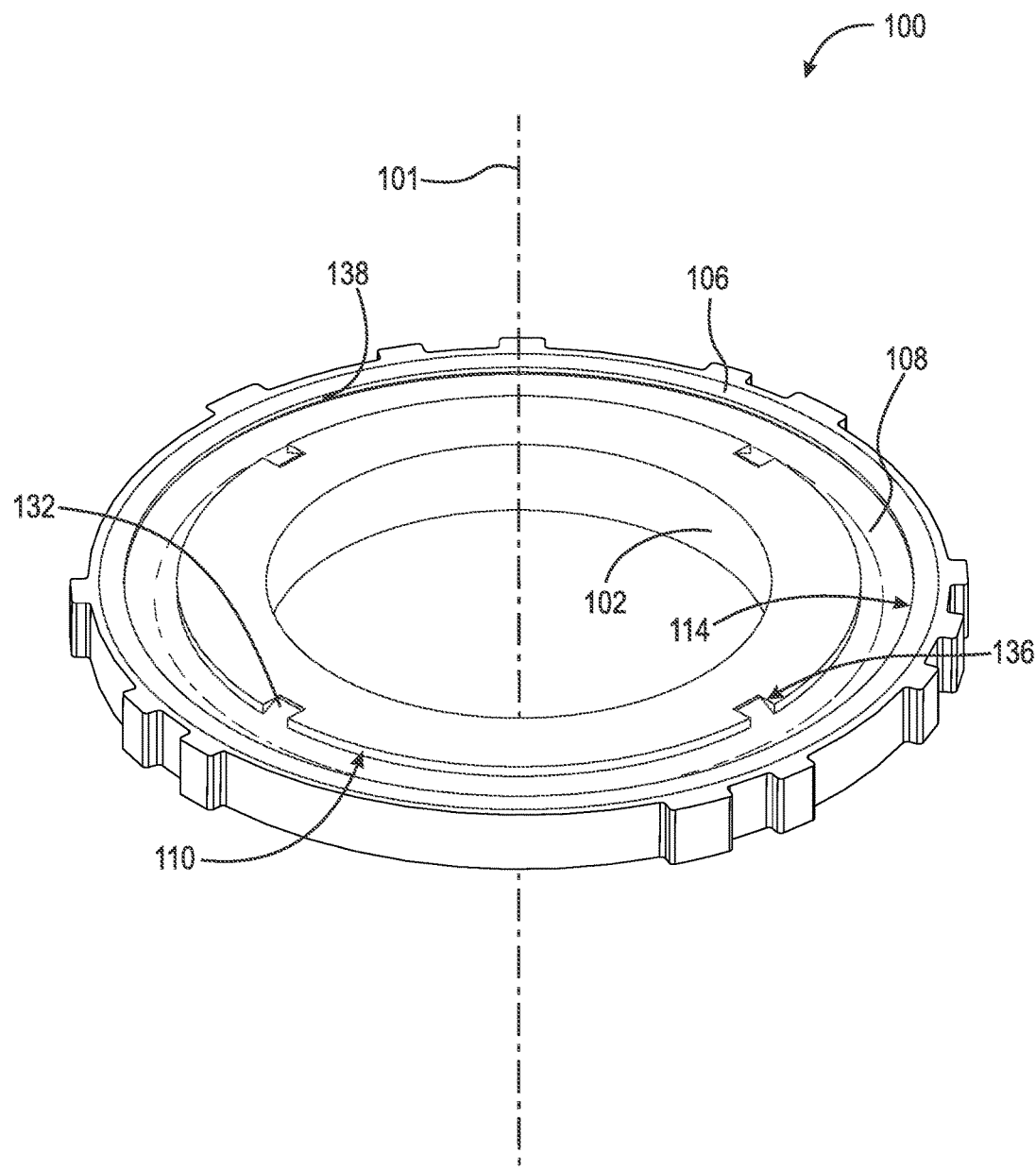
FIG. 2 is a front perspective view of a wedge one-way clutch with radially outer ramps and an axial spring.

FIG. 2 is a front perspective view of one-way wedge clutch 100 with radially outer ramps and an axial spring.

Figure 3:
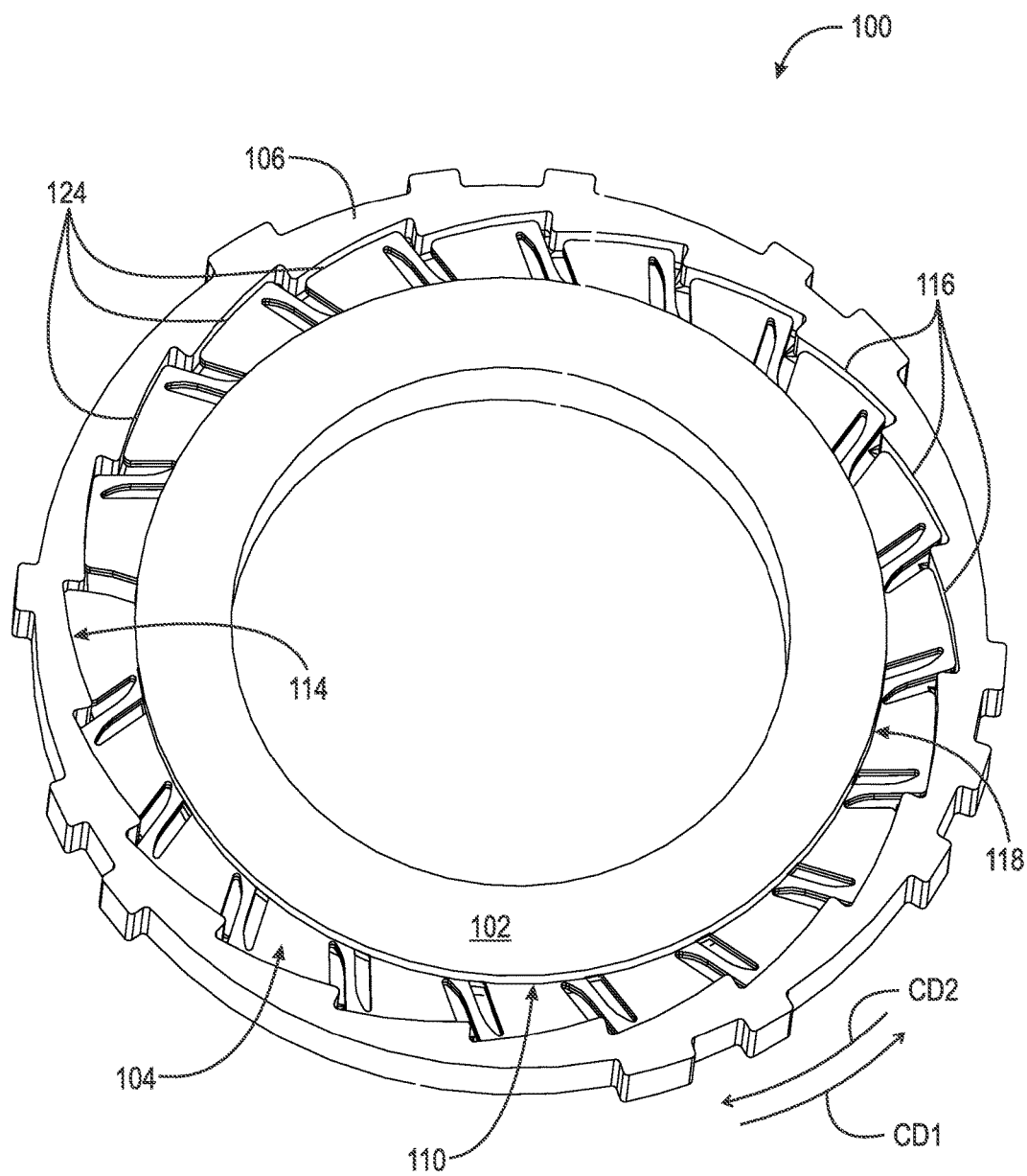
FIG. 3 is a front perspective view of the one-way clutch shown in FIG. 2 with the axial spring removed.

FIG. 3 is a front perspective view of one-way clutch 100 shown in FIG. 2 with the axial spring removed.

Figure 4:
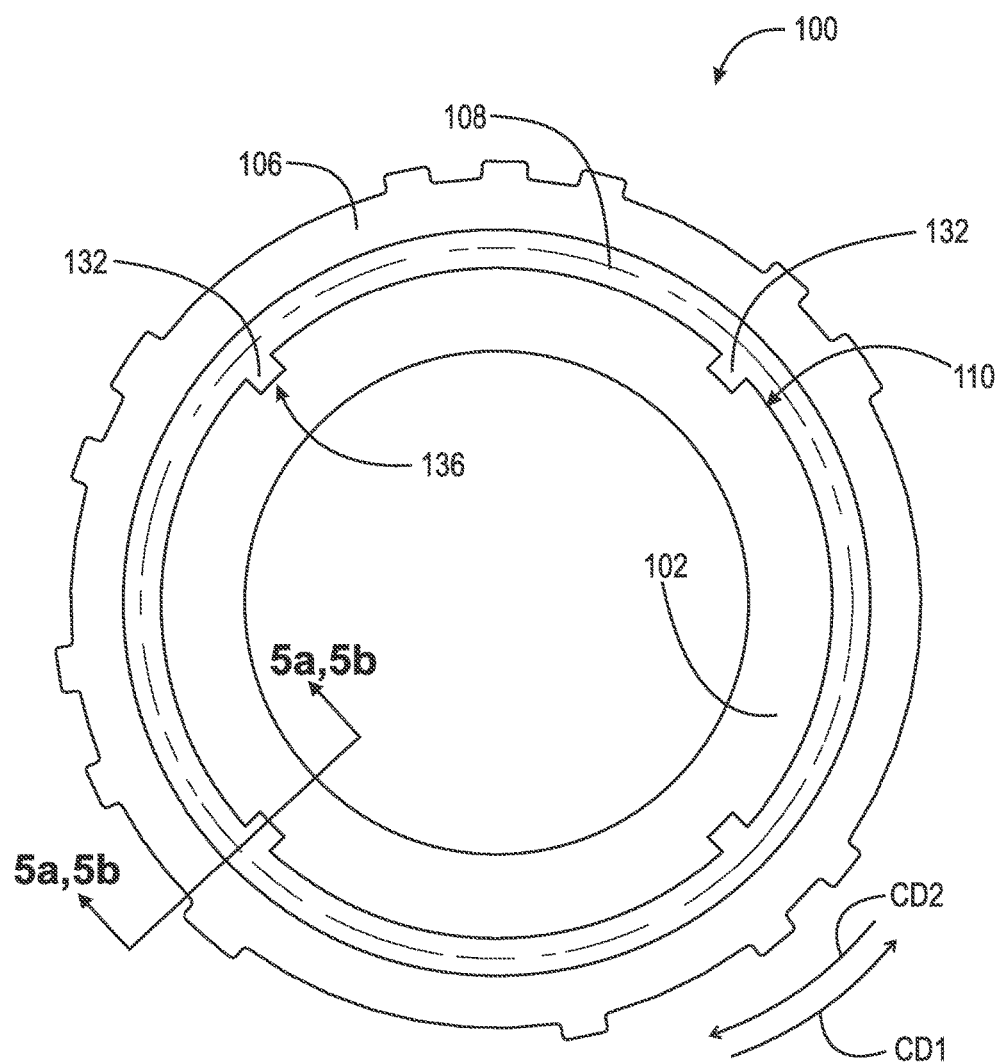
FIG. 4 is a front view of the one-way clutch shown in FIG. 2.

FIG. 4 is a front view of one-way clutch 100 shown in FIG. 2.

Figures 5A, 5B:
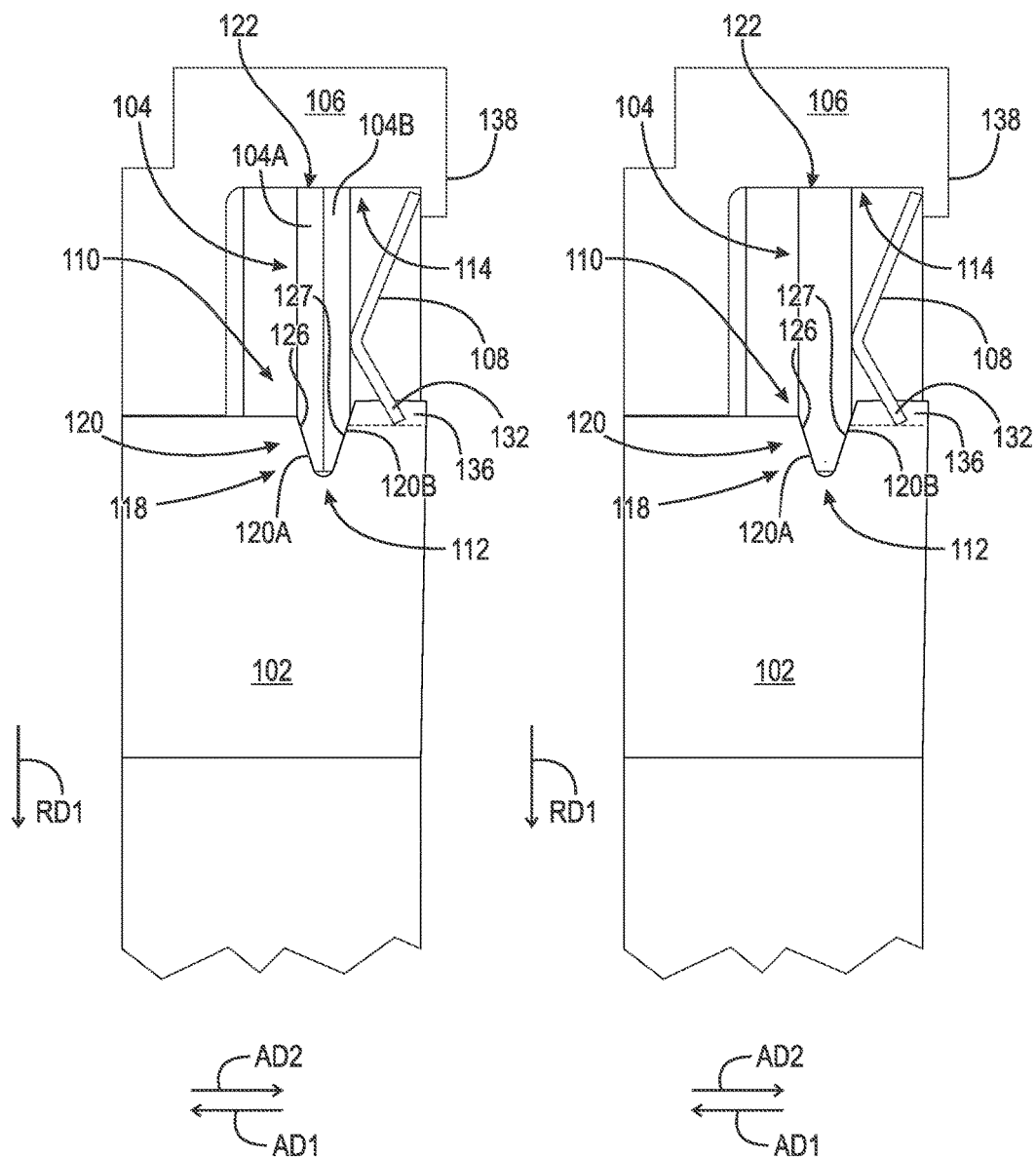
FIG. 5a is a cross-sectional view taken generally along line 5a-5a in FIG. 4, showing dual wedge plates.
FIG. 5b is a cross-sectional view taken generally along line 5b-5b in FIG. 4, showing a single wedge plate.

FIG. 5a is a cross-sectional view taken generally along line 5a-5a in FIG. 4, showing dual wedge plates.

FIG. 5b is a cross-sectional view taken generally along line 5b-5b in FIG. 4, showing a single wedge plate. The following should be viewed in light of FIGS. 2 through 5b. One-way wedge clutch 100 includes axis of rotation 101, inner race 102, at least one wedge plate 104, outer race 106 and at least one resilient element 108. To simplify the presentation, the discussion below is directed to a single wedge plate 104 unless indicated otherwise. However, it should be understood that the discussion is applicable to dual wedge plates 104 as well. To simplify the presentation, the discussion below is directed to a single resilient element 108 unless indicated otherwise. However, it should be understood that the discussion is applicable to more than one resilient element 108 as well. One-way wedge clutch 100 is arranged to rotate about axis of rotation 101. Inner race 102 includes radially outwardly facing surface 110. Outer race 106 is located radially outward of inner race 102 and includes radially inwardly facing surface 114 with radially inwardly extending ramps 116. Wedge plate 104 is disposed radially between inner and outer races 102 and 106, respectively, and includes radially inwardly facing surface 118 and radially outwardly facing surface 122 including radially outwardly extending ramps 124 engaged with radially inwardly extending ramps 116.

Resilient element 108 engages wedge plate 104 and urges at least a portion of radially inwardly facing surface 118 toward and into contact with at least a portion of radially outwardly facing surface 110. In a locked mode, inner race 102, wedge plate 104 and outer race 106 are non-rotatably connected. By "non-rotatably connected", we mean that the elements are connected so that whenever one element rotates, the other elements rotate and vice versa. Radial and/or axial movement of one or all of the elements with respect to each other is possible, but not required, when the elements are non-rotatably connected. In a free-wheel mode, inner race 102 and wedge plate 104 are rotatable with respect to outer race 106.

When relative rotation is present between inner race 102 and outer race 106 with inner race 102 rotating in circumferential direction CD1, the locked mode is initiated and inner race 102, wedge plate 104 and outer race 106 are non-rotatably connected. When relative rotation is present between inner race 102 and outer race 106 with inner race 102 rotating in circumferential direction CD2, opposite circumferential direction CD1, the free-wheel mode is initiated and inner race 102 and wedge plate 104 are rotatable with respect to outer race 106.

In an example embodiment, for relative rotation between inner 102 and outer race 106 in circumferential direction CD1, the frictional engagement of wedge plate 104 and inner race 102 causes wedge plate 104 to rotate in circumferential direction CD1 with respect to outer race 106. As a result, radially outwardly extending ramps 124 slide across radially inwardly extending ramps 116 to displace wedge plate 104 radially inward. That is, since radially inwardly extending ramps 116 slope radially inward in circumferential direction CD1 and radially outwardly extending ramps 124 slope radially outward in circumferential direction CD2, as radially outwardly extending ramps 124 slide up radially inwardly extending ramps 116 in circumferential direction CD1, wedge plate 104 is displaced radially inward such that: surfaces 110 and 118 are compressively engaged and non-rotatably connected; and ramps 116 and 124 are compressively engaged and non-rotatably connected.

To initiate the free-wheel mode, inner race 102 rotates in circumferential direction CD2 with respect to outer race 106 and due to the frictional engagement of wedge plate 104 with inner race 102, wedge plate 104 also rotates in circumferential direction CD2 with respect to outer race 106. As a result, radially outwardly extending ramps 124 slide down radially inwardly extending ramps 116 in circumferential direction CD2 and radially outwardly extending ramps 124 and wedge plate 104 displace radially outward relieving the compressive engagement and non-rotatable connection described above.

In an example embodiment, radially inwardly facing surface 118 includes at least one chamfer 120 disposed along radially outwardly facing surface 110. In an example embodiment, radially outwardly facing surface 110 includes circumferentially disposed groove 112 and at least one chamfer 120 is disposed in circumferentially disposed groove 112.

In an example embodiment, radially inwardly facing surface 118 includes chamfers 120A and 120B, radially outwardly facing surface 110 includes outwardly tapered surfaces 126 and 127 and the respective entireties of chamfers 120A and 120B engage outwardly tapered surfaces 126 and 127. In an example embodiment, wedge plate 104 is designed with a line-to-line contact with circumferentially disposed groove 112. The term "line-to-line contact" means that when chamfers 120A and 120B of wedge plate 104 engage surfaces 126 and 127 of circumferentially disposed groove 112, the engagement is uniformly distributed across the surface area of contact such that there is no concentrated loading and a uniform loading exists instead.

In an example embodiment, resilient element 108 engages wedge plate 104, applies a force to wedge plate 104 in axial direction AD1 and urges wedge plate 104 in axial direction AD1. As a result of the force applied by resilient element 108, at least a portion of chamfer 120A is urged into contact with at least a portion of circumferentially disposed groove 112 along surface 126 of circumferentially disposed groove 112 such that one-way wedge clutch 100 exhibits uniform loading. As a result of the axial force applied by resilient element 108, wedge plate 104 is biased radially inward in radial direction RD1 as described to the locked mode.

Since wedge plate 104 is displaceable between inner and outer races 102 and 106, the preload, or the radially inward bias discussed above, is not achieved from the at least one wedge plate 104 alone. The preload is achieved by resilient element 108 providing an axial load on wedge plate 104. The axial load creates friction between chamfer 120A, opposite chamfer 120B, and inner race 102, in particular, at circumferentially disposed groove 112. In FIG. 5a, the axial load provided by resilient element 108 also creates friction between wedge plates 104A and 104B.

In an example embodiment, resilient element 108 is a diaphragm spring. In an example embodiment, resilient element 108 includes extensions 132 protruding radially inward and axially in axial direction AD2 and inner race 102 includes axially extending channels 136. Each extension 132 is disposed in a respective channel 136 to prevent circumferential rotation between resilient element 108 and inner race 102. In an example embodiment, resilient element 108 includes four extensions 132 and inner race 102 includes four corresponding channels 136. In an example embodiment, resilient element 108 and inner race 102 can include fewer extensions and corresponding channels, respectively. In an example embodiment, resilient element 108 and inner race 102 can include additional extensions and corresponding channels, respectively.

In an example embodiment, outer race 106 includes lip 138 which protrudes radially inwardly and resilient element 108 is engaged with lip 138. Lip 138 can be integral to outer race 106, that is, formed of the material forming outer race 106, or can be a riveted plate or any suitable alternative that holds at least one resilient element 108 in place.

Figure 6:
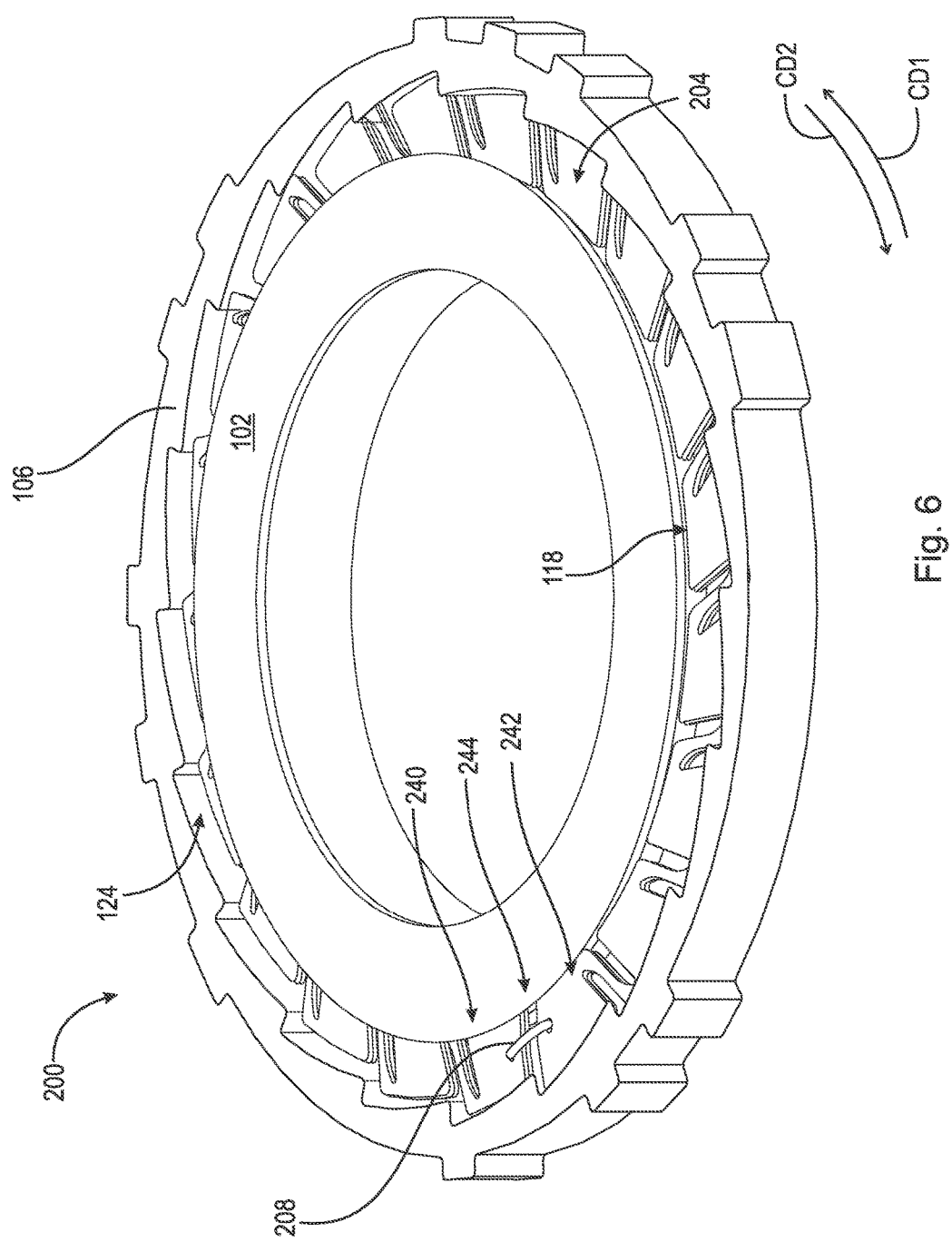
FIG. 6 is a front perspective view of a one-way clutch with radially outer ramps and a circumferential spring.

FIG. 6 is a front perspective view of one-way clutch 200 with radially outer ramps and a circumferential spring.

Figure 7:
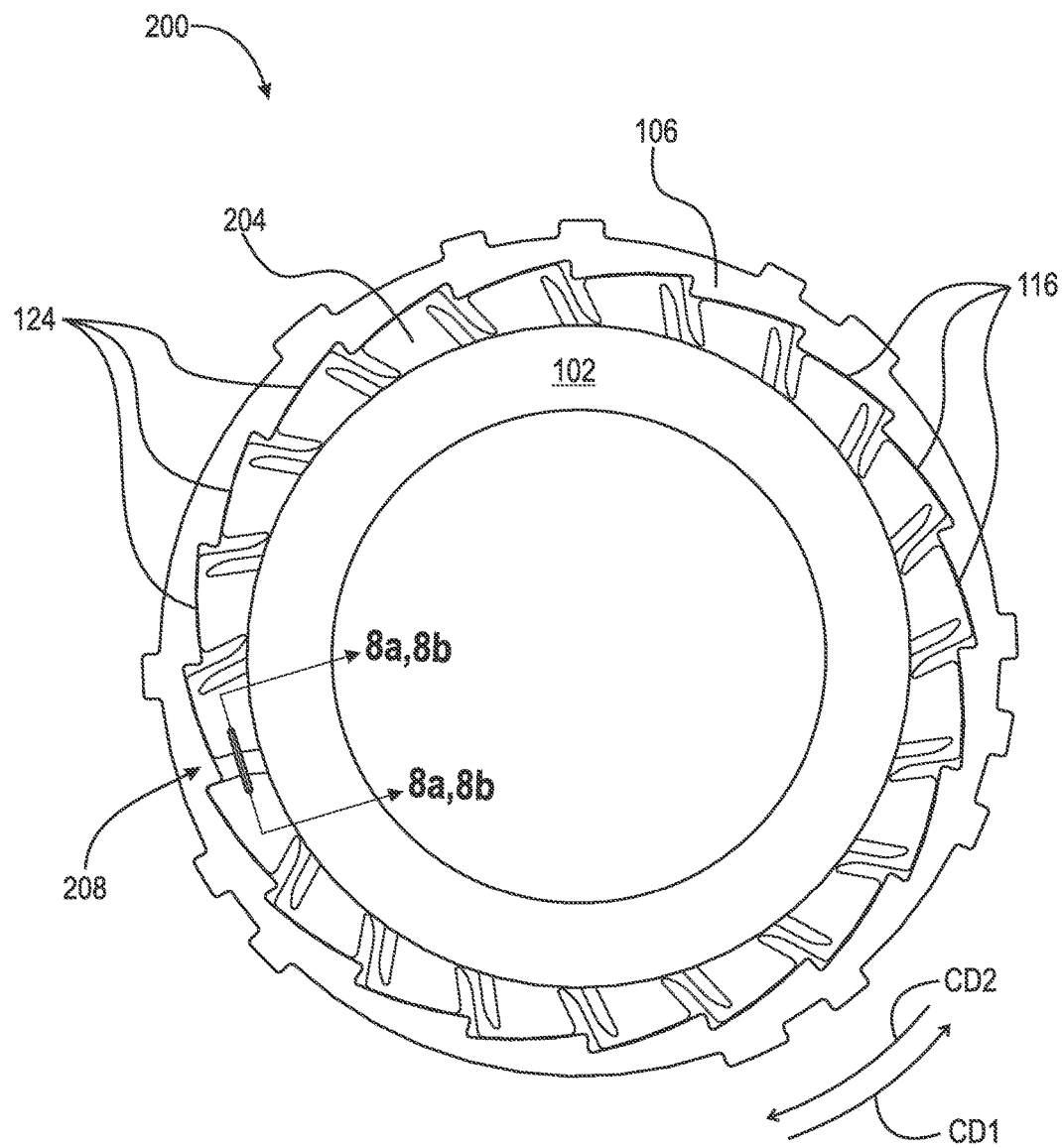
FIG. 7 is a front view of the one-way clutch shown in FIG. 6.

FIG. 7 is a front view of one-way clutch 200 shown in FIG. 6.

Figure 8A:
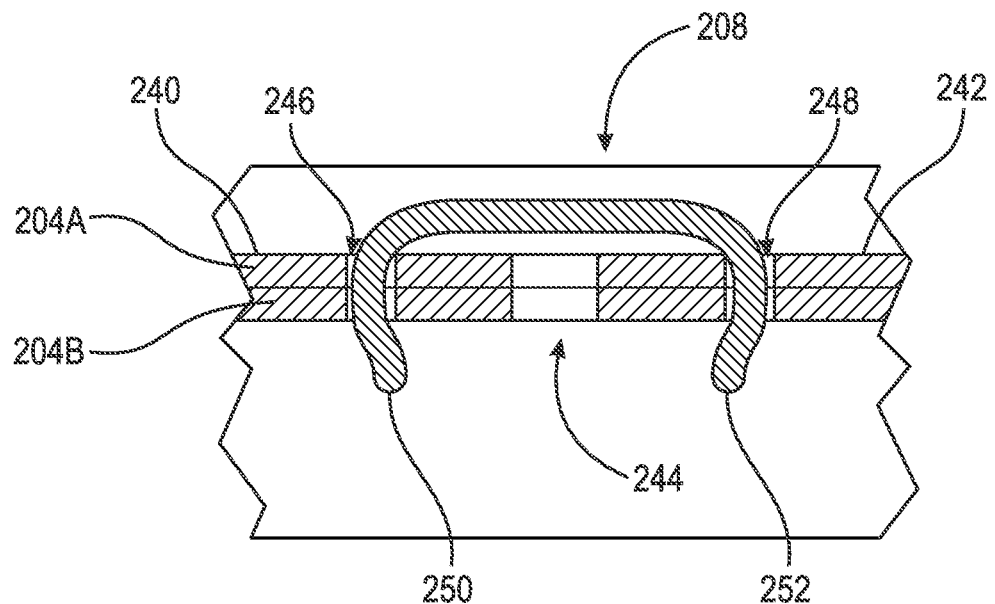
FIG. 8a is a cross-sectional view taken generally along line 8a-8a in FIG. 7, showing dual wedge plates.

FIG. 8a is a cross-sectional view taken generally along line 8a-8a in FIG. 7, showing dual wedge plates.

Figure 8B:
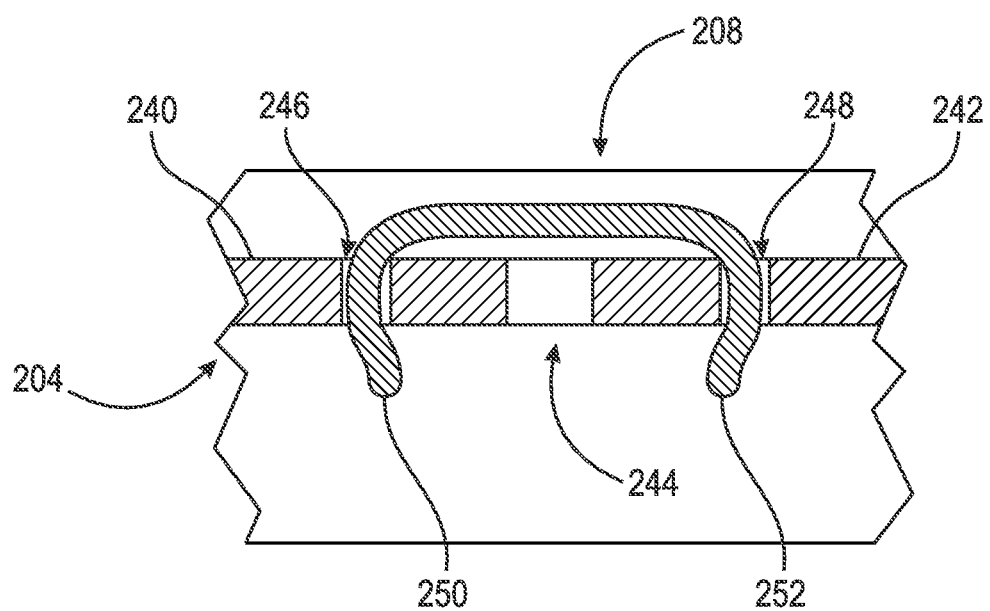
FIG. 8b is a cross-sectional view taken generally along line 8b-8b in FIG. 7, showing a single wedge plate.

FIG. 8b is a cross-sectional view taken generally along line 8b-8b in FIG. 7, showing a single wedge plate. The following should be viewed in light of FIGS. 6 through 8b. One-way clutch 200 includes inner race 102 outer race 106, at least one wedge plate 204, and at least one resilient element 208. The discussion above pertaining to one-way clutch 100, inner race 102, and outer race 106 and their corresponding structural features applies to one-way wedge clutch 200 except as noted. To simplify the presentation, the discussion below is directed to a single wedge plate 204 unless indicated otherwise. However, it should be understood that the discussion is applicable to dual wedge plates 204 as well. To simplify the presentation, the discussion below is directed to a single resilient element 208 unless indicated otherwise. However, it should be understood that the discussion is applicable to more than one resilient element 208 as well.

Wedge plate 204 is disposed radially between inner and outer races 102 and 106, respectively, and, includes surface 118 with at least one chamfer 120 and surface 122 with radially outwardly extending ramps 124. Wedge plate 204 includes circumferential ends 240 and 242 separated by gap 244 in circumferential direction CD1. Resilient element 208 includes end 250 connected to circumferential end 240 and end 252 connected to circumferential end 242. In an example embodiment, circumferential end 240 includes aperture 246 to receive end 250 and circumferential end 242 includes aperture 248 to receive end 252. Resilient element 208 engages wedge plate 204 to provide a circumferential force such that wedge plate 204 is biased radially inward in radial direction RD1 and in frictional contact with inner race 102. That is, resilient element 208 urges ends 250 and 252 toward each other in directions CD1 and CD2, respectively.

For relative rotation between inner race 102 and outer race 106 with inner race 102 rotating in circumferential direction CD1, the locked mode is initiated and inner race 102, wedge plate 204 and outer race 106 are non-rotatably connected. When relative rotation is present between inner race 102 and outer race 106 with inner race 102 rotating in circumferential direction CD2, opposite circumferential direction CD1, the free-wheel mode is initiated and outer race 106 and wedge plate 204 are rotatable with respect to inner race 102.

The circumferential load provided by resilient element 208 creates frictional engagement between chamfers 120A and 120B and circumferentially disposed groove 112. In an example embodiment, for relative rotation between inner race 102 and outer race 106 with inner race 102 rotating in circumferential direction CD1, the frictional engagement of wedge plate 204 and inner race 102 causes wedge plate 204 to rotate in circumferential direction CD1 with respect to outer race 106. As a result, radially outwardly extending ramps 124 slide across radially inwardly extending ramps 116 to displace wedge plate 204 radially inward.

To initiate the free-wheel mode, inner race 102 rotates in circumferential direction CD2 with respect to outer race 106 and due to the frictional engagement of wedge plate 204 with inner race 102, wedge plate 204 also rotates in circumferential direction CD2 with respect to outer race 106. As a result, radially outwardly extending ramps 124 slide down radially inwardly extending ramps 116 in circumferential direction CD2 and wedge plate 204 displaces radially outward relieving the compressive engagement and non-rotatable connection described above.

Figure 9A:
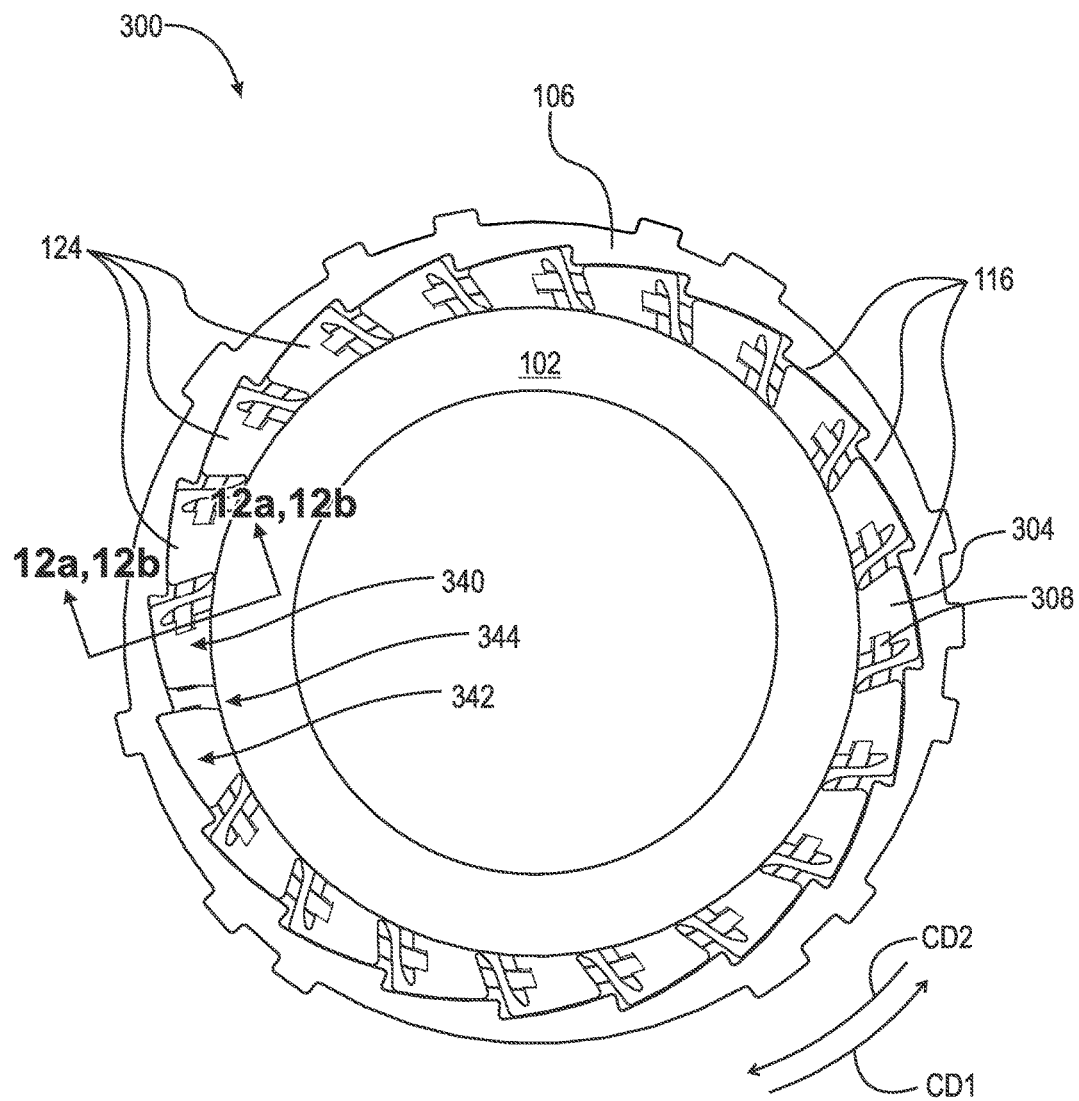
FIG. 9a is a front view of a one-way clutch with radially outer ramps and a circumferential spring.

FIG. 9a is a front view of one-way wedge clutch 300 with radially outer ramps and a circumferential spring.

Figure 9B:
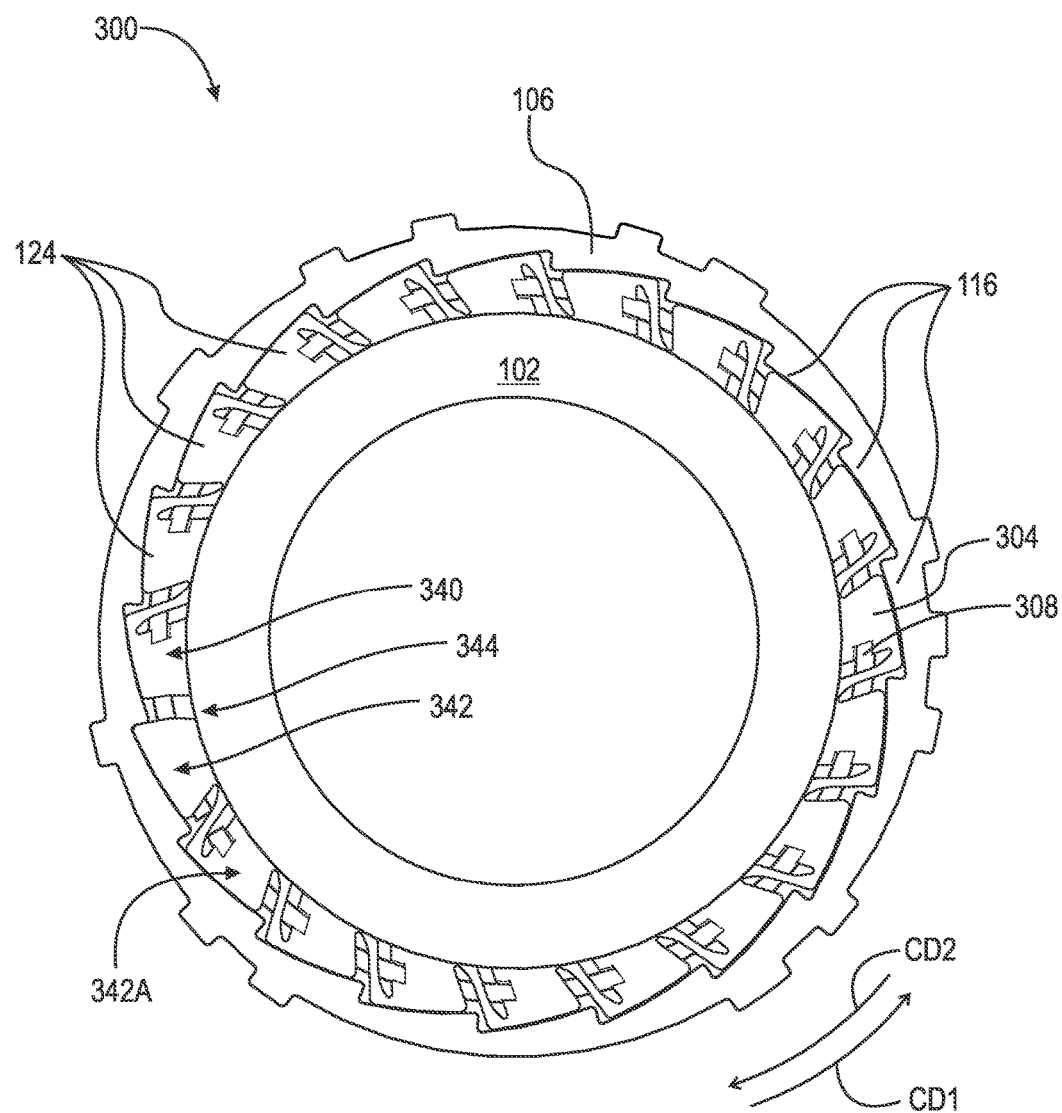
FIG. 9b is a front view of the one-way clutch with radially outer ramps shown in FIG. 9a with the circumferential spring traversing the gap in the at least one wedge plate.

FIG. 9b is a front view of one-way wedge clutch 300 with radially outer ramps shown in FIG. 9a with the circumferential spring traversing the gap in the at least one wedge plate.

Figure 10:
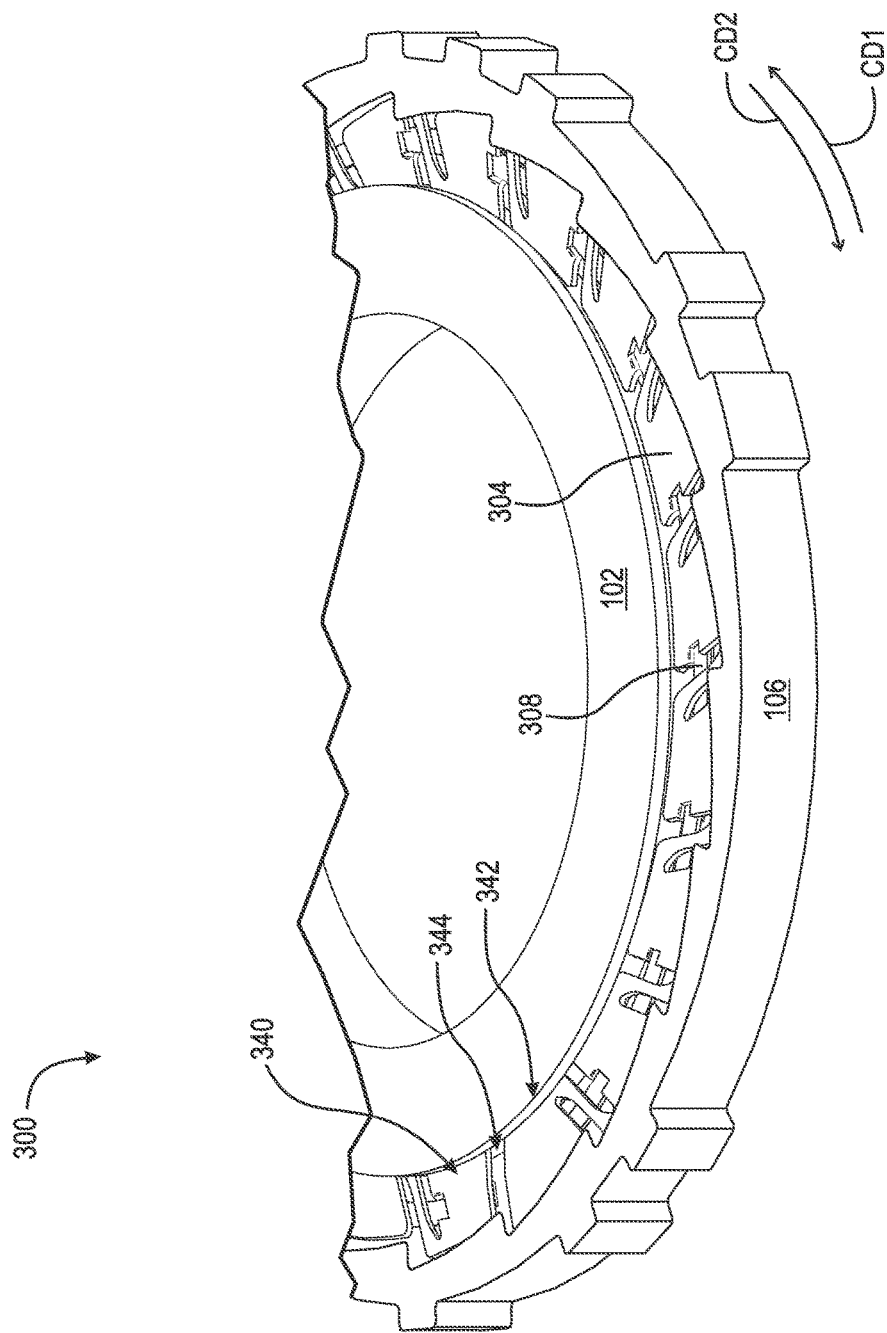

FIG. 10 is a front perspective partial view of one-way wedge clutch 300 shown in FIG. 9a.

Figure 11:
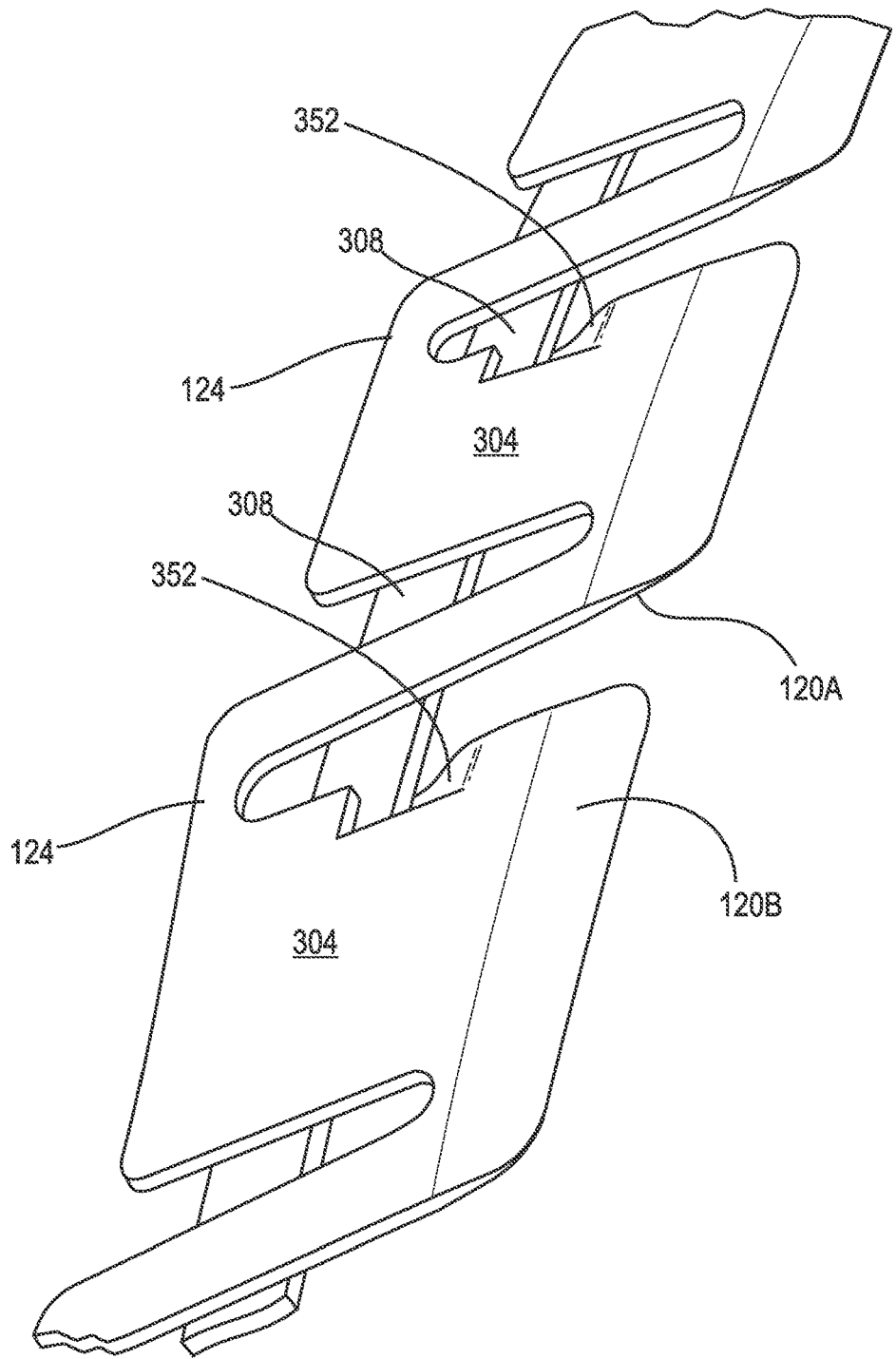

FIG. 11 is an enlarged view of a portion of the wedge plate and resilient element shown in FIG. 9a.

FIG. 12a is a cross-sectional view taken generally along line 12a-12a in FIG. 9a, showing dual wedge plates.

FIG. 12b is a cross-sectional view taken generally along line 12a-12a in FIG. 9a, showing a single wedge plate. The following should be viewed in light of FIGS. 9a through 12b. One-way clutch 300 includes inner race 102, outer race 106, at least one wedge plate 304, and at least one resilient element 308. The discussion above pertaining to one-way clutch 100, inner race 102, and outer race 106, and their corresponding structural features applies to one-way wedge clutch 300 except as noted. To simplify the presentation, the discussion below is directed to a single wedge plate 304 unless indicated otherwise. However, it should be understood that the discussion is applicable to dual wedge plates 304 as well. To simplify the presentation, the discussion below is directed to a single resilient element 308 unless indicated otherwise. However, it should be understood that the discussion is applicable to more than one resilient element 308 as well.

Wedge plate 304 is disposed radially between inner and outer races 102 and 106, respectively. Wedge plate 304 includes surface 118 with at least one chamfer 120 and surface 122 with radially outwardly extending ramps 124. Wedge plate 304 includes circumferential ends 340 and 342 separated by gap 344 in circumferential direction CD1. In an example embodiment, resilient element 308 forms a portion of a ring, engages wedge plate 304 and does not traverse gap 344 in circumferential direction CD1 as shown in FIG. 9a. FIG. 9b illustrates an example embodiment including resilient element 308 forming a portion of a ring, engaging wedge plate 304 and traversing gap 344 in circumferential direction CD1. Resilient element 308 engages with wedge plate 304 and urges at least a portion of at least one chamfer 120 into contact with at least a portion of circumferentially disposed groove 112. Resilient element 308 applies a circumferential force such that wedge plate 304 is biased radially inward in radial direction RD1 and in frictional contact with inner race 102. In other words, the circumferential force applied by resilient element 308 causes a simultaneous radially inward displacement of wedge plate 304.

For relative rotation between inner race 102 and outer race 106 with inner race 102 rotating in circumferential direction CD1, the locked mode is initiated and inner race 102, wedge plate 304 and outer race 106 are non-rotatably connected. When relative rotation is present between inner race 102 and outer race 106 and inner race 102 is rotating in circumferential direction CD2, opposite circumferential direction CD1, the free-wheel mode is initiated and inner race 102 and wedge plate 304 are rotatable with respect to outer race 106.

The circumferential load provided by resilient element 308 creates frictional engagement between chamfers 120A and 120B and circumferentially disposed groove 112. In an example embodiment, for relative rotation between inner race 102 and outer race 106 with inner race 102 rotating in circumferential direction CD1, the frictional engagement of wedge plate 304 and inner race 102 causes wedge plate 304 to rotate in circumferential direction CD1 with respect to outer race 106. As a result, radially outwardly extending ramps 124 slide across radially inwardly extending ramps 116 to displace wedge plate 304 radially inward.

To initiate the free-wheel mode, inner race 102 rotates in circumferential direction CD2 with respect to outer race 106 and due to the frictional engagement of wedge plate 304 with inner race 102, wedge plate 304 also rotates in circumferential direction CD2 with respect to outer race 106. As a result, radially outwardly extending ramps 124 slide down radially inwardly extending ramps 116 in circumferential direction CD2 and radially outwardly extending ramps 124 and wedge plate 304 displaces radially outward relieving the compressive engagement and non-rotatable connection described above.

In an example embodiment, resilient element 308 is secured to wedge plate 304 proximate circumferential ends 340 and 342 as shown in FIG. 9a. In an example embodiment, resilient element 308 is secured to wedge plate 304 proximate circumferential end 342 and adjacent end 342A as shown in FIG. 9b. In an example embodiment (not shown), resilient element 308 is welded to wedge plate 304. In an example embodiment, resilient element 308 is hooked onto wedge plate 304. Any securing means known in the art can be used for securing element 308. In an example embodiment, resilient element 308 is any retaining ring known in the art. In an example embodiment, plate 304 includes side 350 facing axial direction AD2 and tabs 352 holding resilient element 308 in place.

In an example embodiment, the disclosed aspects enable at least one wedge plates 204 and 304 to be in its manufactured state when installed.

Although radially inwardly extending ramps 116 and radially outwardly extending ramps 124 have been shown sloping radially inward in directions CD1 and CD2, respectively, it should be understood that radially inwardly extending ramps 116 and radially outwardly extending ramps 124 can slope radially inward in directions CD2 and CD1, respectively.

It will be appreciated that various features of the above-described disclosure and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A one-way wedge clutch, comprising:
an axis of rotation;
an inner race having a first radially outwardly facing surface;
an outer race located radially outward of the inner race and including a first radially inwardly facing surface with a plurality of radially inwardly extending ramps;
at least one wedge plate radially disposed between the inner and outer races and including:
at least one second radially inwardly facing surface; and,
at least one second radially outwardly facing surface including a plurality of radially outwardly extending ramps engaged with the plurality of radially inwardly extending ramps; and,
at least one resilient element:
engaged with the at least one wedge plate;
urging the at least one wedge plate in an axial direction; and
urging at least a portion of the at least one second radially inwardly facing surface toward at least a portion of the first radially outwardly facing surface, wherein:
in a locked mode, the inner race, the at least one wedge plate, and the outer race are non-rotatably connected; and,
in a free-wheel mode, the inner race is rotatable with respect to the outer race.

2. The one-way wedge clutch as recited in claim 1, wherein relative rotation between the inner race and the outer race:
in a first circumferential direction initiates the locked mode; and,
in a second circumferential direction, opposite the first circumferential direction, initiates the free-wheel mode.

3. The one-way wedge clutch as recited in claim 2, wherein to initiate the locked mode, the plurality of radially inwardly extending ramps and the plurality of radially outwardly extending ramps slide across each other to displace the at least one wedge plate radially inward.

4. The one-way wedge clutch as recited in claim 1, wherein the at least one second radially inwardly facing surface includes at least one chamfer disposed along the first radially outwardly facing surface.

5. The one-way wedge clutch as recited in claim 4, wherein:
the first radially outwardly facing surface includes a circumferentially disposed groove; and,
the at least one chamfer is disposed in the circumferentially disposed groove.

6. The one-way wedge clutch as recited in claim 1, wherein:
the at least one second radially inwardly facing surface includes first and second chamfers;
the first radially outwardly facing surface includes first and second radially outwardly tapered surfaces; and,
the respective entireties of the first and second chamfers engage the first and second outwardly tapered surfaces.

7. The one-way wedge clutch as recited in claim 1, wherein the at least one resilient element urges the at least one wedge plate in a circumferential direction.

8. A one-way wedge clutch, comprising:
an axis of rotation;
an inner race having a first radially outwardly facing surface with a circumferentially disposed groove;
an outer race located radially outward of the inner race and including a first radially inwardly facing surface with a plurality of radially inwardly extending ramps;
at least one wedge plate radially disposed between the inner and outer races and including:
at least one second radially inwardly facing surface including at least one chamfer disposed in the circumferentially disposed groove; and,
at least one second radially outwardly facing surface including a plurality of radially outwardly extending ramps engaged with the plurality of radially inwardly extending ramps; and,
a resilient element:
engaged with the at least one wedge plate;
applying a force to the at least one wedge plate in a first axial direction; and,
urging at least a portion of the at least one chamfer into contact with at least a portion of the circumferentially disposed groove, wherein:
in a locked mode, the inner race, the at least one wedge plate, and the outer race are non-rotatably connected; and,
in a free-wheel mode, the inner race is rotatable with respect to the outer race.

9. The one-way wedge clutch as recited in claim 8, wherein:
for relative rotation between the inner race and the outer race in a first circumferential direction, the one-way wedge clutch is in the locked mode; and,
for relative rotation between the inner race and the outer race in a second circumferential direction, opposite the first circumferential direction, the one-way wedge clutch is in the free-wheel mode.

10. The one-way wedge clutch as recited in claim 9, wherein to initiate the locked mode, the plurality of radially inwardly extending ramps and the plurality of radially outwardly extending ramps are arranged to slide across each other to displace the at least one wedge plate radially inward.

11. The one-way wedge clutch recited in claim 8, wherein the inner race includes a plurality of axially extending channels and the resilient element includes a plurality of extensions disposed in the plurality of channels.

12. The one-way wedge clutch recited in claim 8, wherein:

the outer race includes a lip protruding radially inwardly; and, the resilient element is engaged with the lip.

13. The one-way wedge clutch recited in claim 8, wherein the resilient element is a diaphragm spring.

\* \* \* \* \*